US008649276B2

(12) United States Patent
O'Shea et al.

(10) Patent No.: US 8,649,276 B2
(45) Date of Patent: Feb. 11, 2014

(54) CONTENT TRANSFER

(75) Inventors: Gregory Francis O'Shea, Cambridge (GB); Thomas Christian Zahn, Cambridge (GB); Antony Rowstron, Cambridgeshire (GB)

(73) Assignee: Microsoft Corporation, Redmond, WA (US)

( * ) Notice: Subject to any disclaimer, the term of this patent is extended or adjusted under 35 U.S.C. 154(b) by 1275 days.

(21) Appl. No.: 12/183,607

(22) Filed: Jul. 31, 2008

(65) Prior Publication Data

US 2010/0027588 A1  Feb. 4, 2010

(51) Int. Cl.
 *H04L 12/26* (2006.01)
(52) U.S. Cl.
 USPC .......................... 370/252; 707/620; 709/203
(58) Field of Classification Search
 None
 See application file for complete search history.

(56) References Cited

U.S. PATENT DOCUMENTS

| | | | |
|---|---|---|---|
| 5,924,094 A | 7/1999 | Sutter | |
| 6,505,200 B1 | 1/2003 | Ims et al. | |
| 6,681,370 B2 | 1/2004 | Gounares et al. | |
| 6,920,477 B2 | 7/2005 | Mitzenmacher | |
| 7,162,502 B2 | 1/2007 | Suarez et al. | |
| 7,249,156 B2 | 7/2007 | Chae | |
| 7,254,608 B2 | 8/2007 | Yeager et al. | |
| 7,320,011 B2 | 1/2008 | Koskimies | |
| 7,363,384 B2 | 4/2008 | Chatani et al. | |
| 7,483,925 B2 | 1/2009 | Koskimies et al. | |
| 7,710,984 B2 | 5/2010 | Dunk | |
| 2001/0048728 A1 | 12/2001 | Peng | |
| 2003/0005036 A1* | 1/2003 | Mitzenmacher | 709/203 |
| 2003/0233383 A1 | 12/2003 | Koskimies | |
| 2004/0044774 A1 | 3/2004 | Mangalik et al. | |
| 2004/0087326 A1 | 5/2004 | Dunko et al. | |
| 2004/0172423 A1 | 9/2004 | Kaasten et al. | |
| 2005/0047426 A1 | 3/2005 | Aaltonen et al. | |
| 2005/0091658 A1* | 4/2005 | Kavalam et al. | 718/104 |
| 2005/0108368 A1* | 5/2005 | Mohan et al. | 709/220 |
| 2005/0160045 A1 | 7/2005 | Watanabe et al. | |
| 2005/0266835 A1 | 12/2005 | Agrawal et al. | |
| 2005/0275566 A1 | 12/2005 | Lahtiranta et al. | |
| 2005/0289265 A1 | 12/2005 | Illowsky et al. | |

(Continued)

OTHER PUBLICATIONS

Ott, et al., Drive-Thru Internet: IEEE 802.11b for "Automobile Users", IEEE Infocom (0-07803-8355-9/04), vol. 1, No. 7, 2004, pp. 362-373.*

(Continued)

*Primary Examiner* — Chi Pham
*Assistant Examiner* — Mohammad Adhami
(74) *Attorney, Agent, or Firm* — Pablo Tapia; MIcky Minhas; Zete Law, P.L.L.C.

(57) ABSTRACT

Content transfer between nodes in a communications network is required in many situations. For example, between fixed nodes in a data center, between a fixed node such as a base station and a mobile node such as a mobile telephone and between mobile nodes themselves such as personal digital assistants. In an embodiment a content transfer process for use between nodes where one node knows the size of content to be transferred is described. For example, a file is divided into blocks to be sent between the nodes. A node receiving a block keeps a record of the received blocks and sends that record to the sending node at certain times. By controlling the times at which the records are sent the number of messages that need to be sent to transfer the records is low and the blocks are transferred in an efficient manner.

18 Claims, 12 Drawing Sheets

(56) References Cited

U.S. PATENT DOCUMENTS

| | | | |
|---|---|---|---|
| 2006/0045115 | A1 | 3/2006 | Nix et al. |
| 2006/0080032 | A1 | 4/2006 | Cooper et al. |
| 2006/0123010 | A1 | 6/2006 | Landry et al. |
| 2007/0296805 | A1 | 12/2007 | Tedenvall et al. |
| 2008/0002599 | A1* | 1/2008 | Yau et al. .................. 370/310 |
| 2008/0016160 | A1 | 1/2008 | Walter et al. |
| 2008/0104142 | A1 | 5/2008 | Oh et al. |
| 2009/0067551 | A1* | 3/2009 | Chen et al. .................. 375/340 |
| 2009/0228433 | A1* | 9/2009 | Aguilar Saborit et al. ....... 707/2 |
| 2010/0030840 | A1 | 2/2010 | O'Shea et al. |
| 2011/0070757 | A1 | 3/2011 | Krampf et al. |
| 2011/0126084 | A1* | 5/2011 | Serret-Avila ................. 714/807 |

OTHER PUBLICATIONS

Ahlswede, et al., "Network Information Flow", retrieved on May 13, 2008 at <<http://www.cs.cornell.edu/courses/cs783/2007fa/papers/acly.pdf>>, IEEE Transactions on Information Theory (0018-9448/00), vol. 46, No. 4, 2000, pp. 1204-1216.

Ahmed, et al., "VANETCODE: Network Coding to Enhance Cooperative Downloading in Vehicular Ad-Hoc Networks", retrieved on May 13, 2008 at <<http://delivery.acm.org/10.1145/1150000/1143654/p527-ahmed.pdf?key1=1143654&key2=2510760121&coll=GUIDE&dl=GUIDE&CFID=27651506&CFTOKEN=41866410>>, ACM IWCMC 2006 (1-59593-306-9/06/0007), 2006, pp. 527-532.

Bakre, et al., "I-TCP: Indirect TCP for Mobile Hosts", retrieved on May 13, 2008 at <<http://www.cs.ucsd.edu/~snoeren/cse291/papers/bb95.>>, IEEE Computer Society ICDCS, 1995, pp. 136-154.

Balakrishnan, et al., "Improving TCP/IP Performance over Wireless Networks", retrieved on May 13, 2008 at <<http://delivery.acm.org/10.1145/220000/215544/p2-balakrishnan.pdf? key1=215544&key2=0632560121&coll=GUIDE&dl=GUIDE&CFID=27612604& CFTOKEN=56828195>>, ACM MobiCom (0-89791-814-2/95/10), 1995, pp. 2-11.

Bloom, et al., "Space/Time Trade-Offs in Hash Coding with Allowable Errors", retrieved on May 13, 2008 at <<http://delivery.acm.org/10.1145/370000/362692/p422-bloom.pdf?key1=362692&key2=1372560121&coll=GUIDE&dl=GUIDE&CFID=27613094& CFTOKEN=79796450>>, Communications of the ACM, vol. 13, No. 7, 1970, pp. 422-426.

Bychkovsky, et al., "A Measurement Study of Vehicular Internet Access Using In Situ Wi-Fi Networks", retrieved on May 13, 2008 at <<http://delivery.acm.org/10.1145/1170000/1161097/p50-bychkovsky.pdf?key1=1161097&key2=8982560121&coll=GUIDE&dl=GUIDE&CFID=27613318&CFTOKEN=30721974>>, ACM MOBICOM (1-59593-286-0/06/0009), 2006, pp. 50-61.

Byers, et al., "A Digital Fountain Approach to Reliable Distribution of Bulk Data", retrieved on May 13, 2008 at <<http://delivery.acm.org/10.1145/290000/285258/p56-byers.pdf?key1=285258&key2=3413560121&coll=GUIDE&dl=GUIDE&CFID=67782843& CFTOKEN=10907864>>, ACM SIGCOMM (1-58113-003-1/98/0008), 1998, pp. 56-67.

Das, et al., "SPAWN: A Swarming Protocol for Vehicular Ad-Hoc Wireless Networks", retrieved on May 13, 2008 at <<http://coblitz.codeen.org:3125/citeseer.ist.psu.edu/cache/papers/cs2/715/http:zSzzSzwww.gpau.netzSzpaperszSzVenet04.pdf/das04spawn.pdf>>, ACM VANET 2004 (1-58113-922-05/04/0010), 2004, pp. 93-94.

Gass, et al., "Measurements of In-Motion 802.11 Networking", retrieved on May 13, 2008 at <<http://ieeexplore.ieee.org/iel5/11140/35655/01691716.pdf?tp=&isnumber=&arnumber=1691716>>, IEEE WMCSA 2006 (0-7695-2439-7/06), 2006, pp. 1-6.

Gkantsidis, et al., "Network Coding for Large Scale Content Distribution", retrieved on May 13, 2008 at <<http://ieeexplore.ieee.org/iel5/9990/32102/01498511.pdf?tp=&isnumber=&arnumber=1498511>>, IEEE INFOCOM (0-7803-8968-9/05), 2005, pp. 2235-2245.

Hadaller, et al., "Vehicular Opportunistic Communication under the Microscope", retrieved on May 13, 2008 at <<http://delivery.acm.org/10.1145/1250000/1247685/p206-hadaller.pdf?key1=1247685&key2=9034560121&coll=GUIDE&dl=GUIDE&CFID=67784968& CFTOKEN=52288046>>, ACM MobiSys (978-1-59593-614-01/06/0006), 2007, pp. 206-219.

IEEE 802.11 working group, "Wireless LAN Medium Access Control (MAC) and Physical Layer (PHY) Specifications", retrieved on May 13, 2008 at <<http://www.csse.uwa.edu.au/adhocnets/802.11-1999.pdf>>, ANSI/IEEE Std 802.11, 1999, pp. 1-528.

Klemm, et al., "A Special-Purpose Peer-to-Peer File Sharing System for Mobile Ad Hoc Networks", retrieved on May 13, 2008 at <<http://ieeexplore.ieee.org/iel5/9004/28571/01286080.pdf?tp=&isnumber=&arnumber=1286080>>, IEEE VTC'03 (0-7803-7954-3/03), vol. 4, 2003, pp. 2758-2763.

Lee, et al., "CodeTorrent: Content Distribution using Network Coding in VANET", retrieved on May 13, 2008 at <<http://netlab.cs.ucla.edu/wiki/files/codetorrent_mobishare06.pdf>>, ACM MobiShare 2006 (1-59593-558-4/06/09), 2006, pp. 1-6.

Lee, et al., "First Experience with Cartorrent in a Real Vehicular Ad Hoc Network Testbed", retrieved on May 13, 2008 at <<http://ieeexplore.ieee.org/iel5/4300797/4300798/04300814.pdf?tp=&isnumber=&arnumber=4300814>>, IEEE MOVE 2007 (978-1-4244-1690-5/07), 2007, pp. 109-114.

Lehtinen, "Secure and Mobile P2P File Sharing", retrieved on Jul. 25, 2008 at <<http://www.tml.tkk.fi/Publications/C/21/Lehtinen_ready.pdf>>, Helsinki University of Technology (Telecommunications Software and Multimedia Laboratory, T-110.5190 Seminar), 2006, pp. 1-7.

Mahajan, et al., "Understanding Wifi-Based Connectivity from Moving Vehicle", retrieved on May 13, 2008 at <<http://delivery.acm.org/10.1145/1300000/1298351/p321-mahajan.pdf?key1=1298351&key2=8935560121&coll=GUIDE&dl=&CFID=4275787& CFTOKEN=30402676>>, ACM IMC 2007 (978-1-59593-908-1/07/0010), 2007, pp. 321-326.

Merkle, "A Digital Signature Based on a Conventional Encryption Function", retrieved on May 13, 2008 at <<http://dsns.csie.nctu.edu.tw/research/crypto/HTML/PDF/C87/369.PDF, Springer-Verlag Crypto 1987, pp. 369-378.

Minsky, et al., "Set Reconciliation with Nearly Optimal Communication Complexity", IEEE Transactions on Information Theory, vol. 49, No. 9, 2003, pp. 2213-2218.

Mitzenmacher, "Compressed Bloom Filters", retrieved on May 13, 2008 at <<http://delivery.acm.org/10.1145/390000/384004/p144-mitzenmacher.pdf?key1=384004&key2=7275560121&coll=GUIDE&dl=GUIDE&CFID=27617480& CFTOKEN=76494443>>, IEEE/ACM Transactions on Networking, vol. 10, No. 5, 2002, pp. 604-612.

Nandan, et al., "Co-operative Downloading in Vehicular Ad-hoc Wireless Networks", retrieved on May 13, 2008 at <<http://www.cs.ucla.edu/NRL/OverProbe/papers/spawn_wons_2005.pdf>>, IEEE WONS, 2005, pp. 1-10.

Ott, et al., "A Disconnection-Tolerant Transport for Drive-Thru Internet Environments", retrieved on May 13, 2008 at <<http://ieeexplore.ieee.org/iel5/9990/32101/01498464.pdf?tp=&isnumber=&arnumber=1498464>>, IEEE INFOCOM (0-7803-8968-9/05), vol. 3, 2005, pp. 1849-1862.

Ott, et al., "Drive-Thru Internet: IEEE 802.11b for "Automobile" Users", retrieved on May 13, 2008 at <<http://ieeexplore.ieee.org/iel5/9369/29751/01354509.pdf?tp=&isnumber=&arnumber=1354509>>, IEEE INFOCOM (0-7803-8355-9/04), vol. 1, No. 7, 2004, pp. 362-373.

Pau, "Car-Torrent: A Swarming Protocol for Car-to-Car Networks", retrieved on May 14, 2008 at <<http://www.cse.ust.hk/pg/seminars/S05/pau.html>>, Seminar S05 (Hong Kong University of Science and Technology, CSE), 2005, pp. 1-2.

Yang, et al., "A Peer-to-Peer File Resource Sharing System for Mobile Devices", retrieved on Jul. 25, 2008 at <<http://ieeexplore.ieee.org/iel5/4539298/4539299/04539360.

(56) References Cited

OTHER PUBLICATIONS pdf?isnumber=4539299& prod=CNF&arnumber=4539360&arSt=275&ared=280&arAuthor=Yang%2C+Chao-Tung%3B+Chen%2C+Chun-Jen%3B+Chen%2C+Hung-Yen%3B+Hsu%2C+Ching-Hsien>>, IEEE GPC.WORKSHOPS (978-0-7695-3177-9/08), 2008, pp. 275-280.

Zhang, et al., "Study of a Bus-Based Disruption Tolerant Network: Mobility Modeling and Impact on Routing", retrieved on May 13, 2008 at <<http://delivery.acm.org/10.1145/1290000/1287876/p195-zhang.pdf?key1=1287876&key2=2686560121&coll=GUIDE&dl=GUIDE&CFID=27619340&CFTOKEN=79726899>>, ACM Mobicom (978-1-59593-681-3/07/0009), 2007, pp. 195-206.

* cited by examiner

CONTENT TRANSFER

BACKGROUND

There are many situations where it is required to transfer content such as a file or other information between two devices or communications nodes. For example this may be between nodes which have fixed locations and where the communications network is wired or wireless. For example, files may need to be transferred between fixed nodes in a data centre where wired connections exist between the nodes. Other situations arise where the nodes are mobile, such as personal digital assistants (PDAs), mobile telephones, laptop computers and the like. In some of these situations connections between nodes may be short-lived and lossy.

A variety of communications network protocols have been developed to deal with these various content transfer situations. For example, some of these use coding schemes to encode the data such that if an arbitrary set of data packets are received, the receiver is able to reconstruct the original data. However, a drawback of using coding schemes is the computational overhead of encoding and decoding. Other communications network protocols use acknowledgements and retransmission whereby the receiver explicitly requests retransmission of missed packets.

Generally speaking it is desired to improve on existing communications protocols to enable data to be transferred between two communications network nodes efficiently, accurately and with reduced computational overhead. It is desired to achieve this in a manner suitable for transferring content over many different types of connection, including fixed, wired connections and connections which are short-lived and lossy.

The embodiments described below are not limited to implementations which solve any or all of the disadvantages of known communications network protocols.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Content transfer between nodes in a communications network is required in many situations. For example, between fixed nodes in a data center, between a fixed node such as a base station and a mobile node such as a mobile telephone and between mobile nodes themselves such as personal digital assistants. In an embodiment a content transfer process is described for use between nodes where the size of the content to be transferred is known to one of the nodes before the transfer starts. For example, a file is divided into blocks to be sent between the nodes. A node receiving a block keeps a summary record of the received blocks and sends that summary record to the sending node at certain times. This summary records acts as an acknowledgement. By controlling the times at which the records are sent the number of acknowledgement packets that need to be sent during the transfer is low and this results in lower bandwidth utilization and faster transfers. Example content discovery processes for use with the content transfer process are described.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a communications network of mobile nodes mounted in vehicles, the system described is provided as an example and not a limitation. As those skilled in the art will appreciate, the present examples are suitable for application in a variety of different types of communications networks where the nodes are either fixed or mobile.

As mentioned above it is desired to improve on existing communications protocols to enable data to be transferred between two communications network nodes efficiently and with reduced computational overhead. It is desired to achieve this in a manner suitable for transferring content over many different types of connection, including fixed, wired connections and wireless connections which are short-lived and lossy.

Suppose that a file or other piece of information needs to be transferred from a source node in a communications network to a destination node in the communications network. In the methods described herein the source node is required to know the size of the file or other item of content to be transferred.

For example, this information may be known to the source node, which has access to the file or other information to be transferred. The information about the file size is provided to the destination node in any suitable manner, for example sent in a packet from the source node. It is also recognized that, when receiving content at the destination node, the order in which the contents of the file or other information is received is not important.

Figure 1:
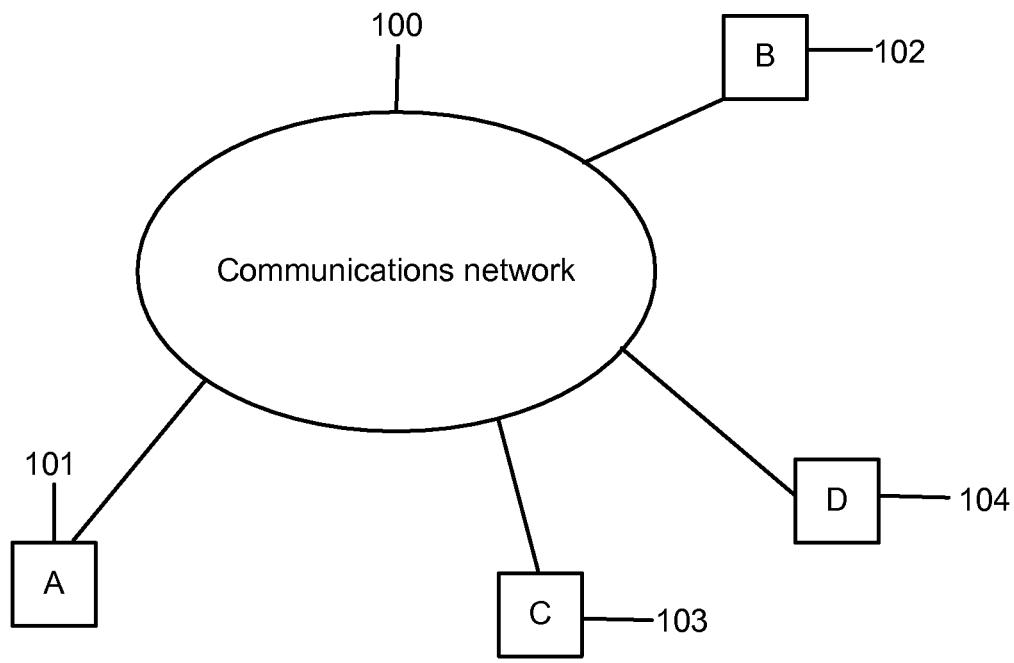
FIG. 1 is a schematic diagram of a communications network.

FIG. 1 is a schematic diagram of a communications network 100 having communications network nodes 101, 102, 103, 104 suitable for implementing the methods described herein. The communications network 100 is of any suitable type, for example, it may be an optical communications network, wireless communications network, wired communications network or other type of communications network. In some embodiments the communications network is a wireless local area network in which a plurality of a nodes are mobile and support a communications protocol from the IEEE 802.11 family of protocols. The communications network nodes 101-104 may have fixed locations or may be mobile, such as PDAs carried by people, mobile satellite navigation communications devices in vehicles, or mobile telephones. The communications network nodes 101-104 may have limited computational power such as satellite navigation devices used in motor vehicles, PDAs and the like. Alternatively the communications network nodes 101-104 may have larger computational power resources such as nodes in data centers.

Each communications network node comprises a processor arranged to provide a communications protocol stack having a plurality of layers such as a physical layer, data link layer, network layer, transport layer and application layer. Different numbers and arrangements of layers in the protocol stack may be used. In some embodiments the data link layer provides a wireless communication protocol such as from the IEEE 802.11 family of protocols although this is not essential. Any suitable data link layer protocol may be used.

The methods described herein relate to communications protocols at the transport layer. Any suitable protocols at the network layer, data link layer and physical layer may be used which enable the functionality at the transport layer to be supported. For example, in some embodiments Internet Protocol (IP) is used at the network layer and in other embodiments it is not.

The methods described herein are incorporated as part of any suitable transport layer communications protocol. A connection is established between a source node and a destination node in order that data such as a file or other piece of information having a fixed size may be transferred from the source node to the destination node. The connection may be established using processes at the data link layer or in any other suitable manner. The protocol is packet-based and the packets may be sent and/or received in any order whilst following the methods described herein.

Figure 2:
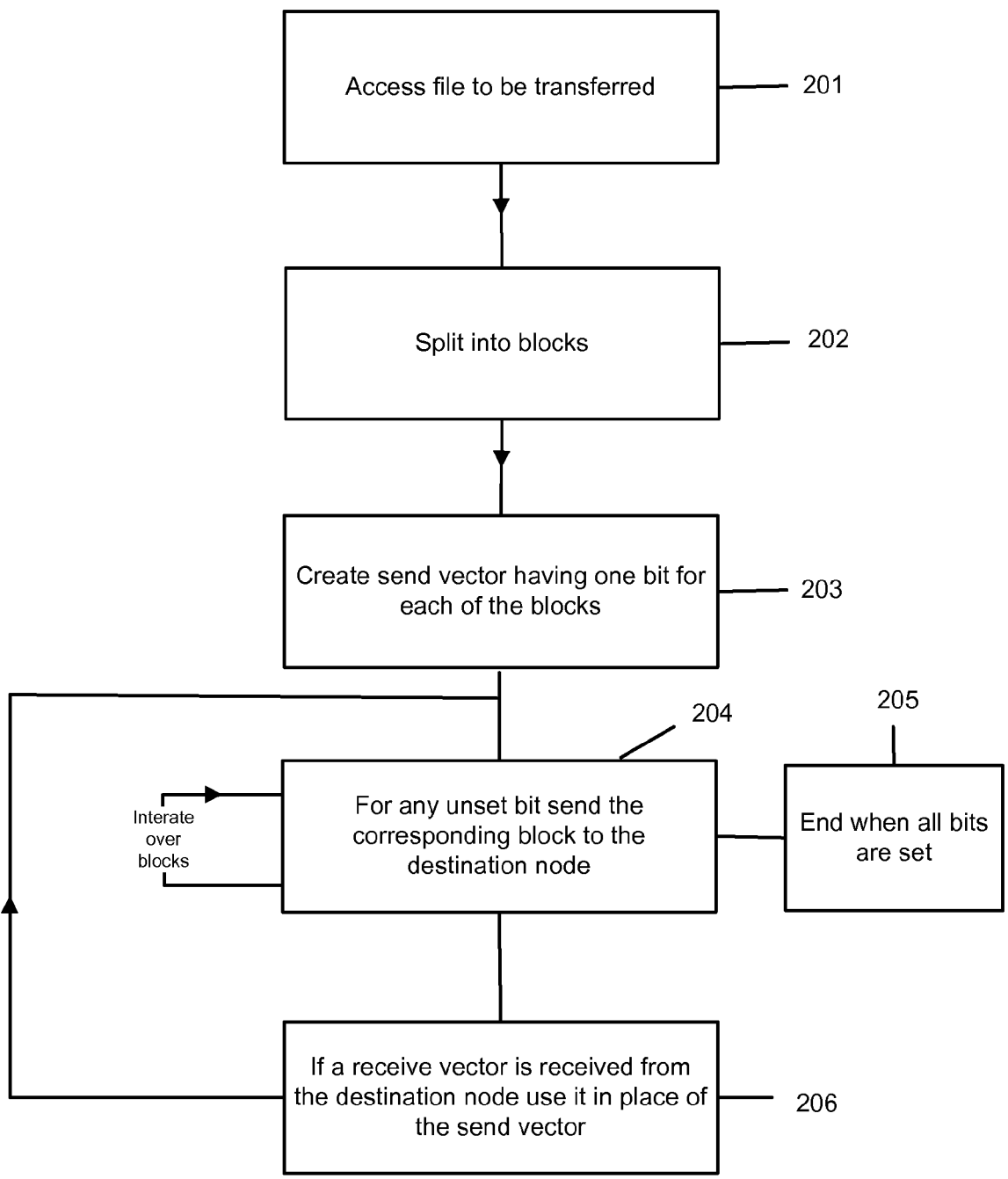
FIG. 2 is a block diagram of a method at a communications node arranged to send information to another node.

FIG. 2 is a block diagram of a method at a source node in a communications network. The source node may be any of the communications nodes of FIG. 1 and it may also operate as a destination node.

The source node has an input which accesses (block 201) a file or other piece of content to be transferred to a destination node. The source node comprises a processor of any suitable type which is arranged to split the file or other piece of content into blocks (see block 202) where a block has a pre-specified size. The processor creates a send vector having one bit for each of the blocks (see block 203) and this vector is initialized, for example, so that each bit has the value zero.

When the send vector is initialized all the bits in that vector are considered to be unset. A process of sending blocks to the destination node then occurs (see block 204 of FIG. 2). For any unset bit in the send vector the processor is arranged to send the block corresponding to that unset bit to the destination node. This process iterates over the blocks and ends when all the bits in the send vector are set (block 205). During this process, if a receive vector is received from the destination node (block 206) that receive vector is used in place of the send vector. The receive vector is described in more detail below with reference to FIG. 3. When the blocks are sent they may be formed into packets, for example, with one or more blocks forming the payload of a packet and the packet having a header comprising control information such as details of the source node and destination node.

Figure 3:
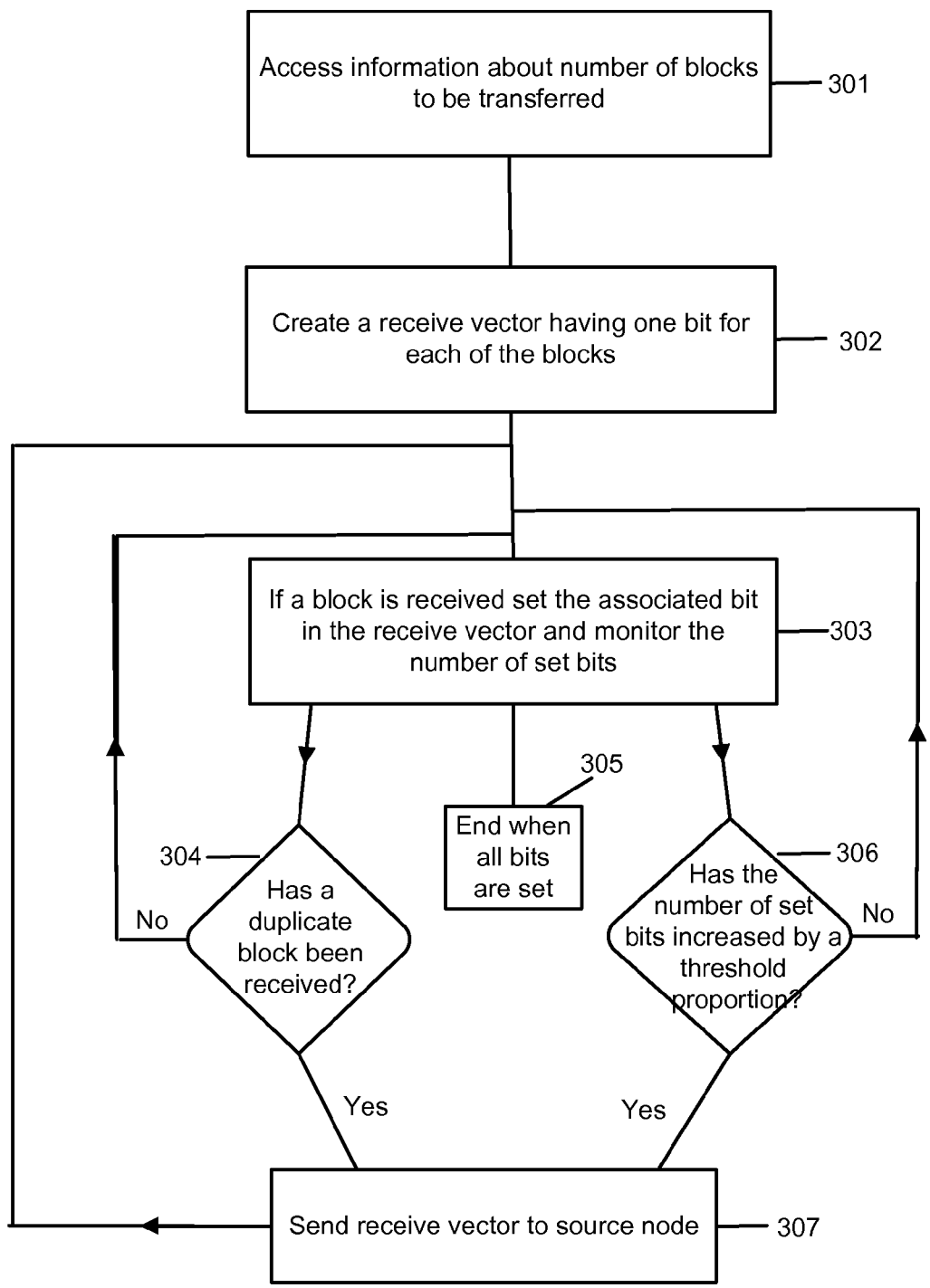
FIG. 3 is a block diagram of a method at a communications node arranged to receive information from another node.

FIG. 3 is a block diagram of a method at a destination node. The destination node accesses information about the number of blocks of data to be transferred (block 301 of FIG. 3). This information is obtained in any suitable manner. For example, a connection between the source and destination node may already be established and the source node may provide this information to the destination node. The destination node comprises a processor which is arranged to create a receive vector having one bit for each of the blocks to be transferred (302 of FIG. 3). The receive vector is initialized so that each of the bits is considered to be unset.

A connection between the source node and the destination node is already established as mentioned above and the destination node monitors that connection for packets. If a block is received, the processor at the destination node is arranged to set the associated bit in the receive vector and monitor the number of set bits in that vector (block 303 of FIG. 3).

If the number of set bits has increased by a threshold proportion (block 306 of FIG. 3) then the destination node sends its receive vector to the source node (block 307 of FIG. 3). The threshold proportion may be 50% or any other suitable threshold. Also, the processor is optionally arranged to send the receive vector to the source node if a duplicate block is received at the destination node (blocks 304 and 307 of FIG. 3). When all the bits in the receive vector are set the process ends (block 305).

By using the receive vectors as described herein the number of acknowledgement packets that need to be sent is low. The acknowledgement packets here are those sending the receive vector. This improves efficiency and reduces pressure on communications network resources. For example, the destination node does not need to send a copy of the receive vector every n packets. It is able to send a copy of its receive bit vector based on a function of the received packets. For example, whenever the destination node sends the receive vector it is able to record the number of set bits. When the number of set bits increases by 50% (or other suitable threshold proportion) this triggers a sending of the receive vector. Also, if the destination node gets a predefined number of duplicate packets, for example, one, it triggers the sending of the receive vector. In this way the protocol generates O(log k) packets containing receive vector information (where k is the number of packets required to transfer a file). For example, to transfer a 1 MB file over a link with a 30% loss rate the number of receive vector packets sent is less than 1% of the total number of packets needed to complete the transfer. In addition, the number of duplicate packets received at the destination node will be close to zero. Also, if a file transfer is interrupted and needs to be resumed with either the same or different communications network node, the destination node is able to provide the receive vector and the transfer process starts from that point.

It is also noted that, if the connection between the source node and destination node has a high loss rate and this leads to a packet containing the receive vector being dropped, then recovery is quick. This is because another packet sending the receive vector will shortly be sent. As a result the process is robust.

The receive vector is typically of a size which is able to fit into a single packet. Where a very large file is to be transferred from the source node to the destination node it may not be possible to fit the receive vector into a single packet. In this case it is possible for the source node to decompose or split the file into one or more parts and send each of those separately using the processes described herein. Once all the parts are received the destination node can reconstruct the original large file.

It is not necessary to use IP in conjunction with the methods described above. Instead nodes may be identified using their MAC addresses incorporated into a header in all packets. In this way it is not necessary to detect and manage duplicate IP addresses or to use address resolution protocol (ARP). Also, the full packet size that the wireless network interface controller can support may be exploited. This reduces the overhead per packet and allows a higher goodput to be achieved.

Figure 4:
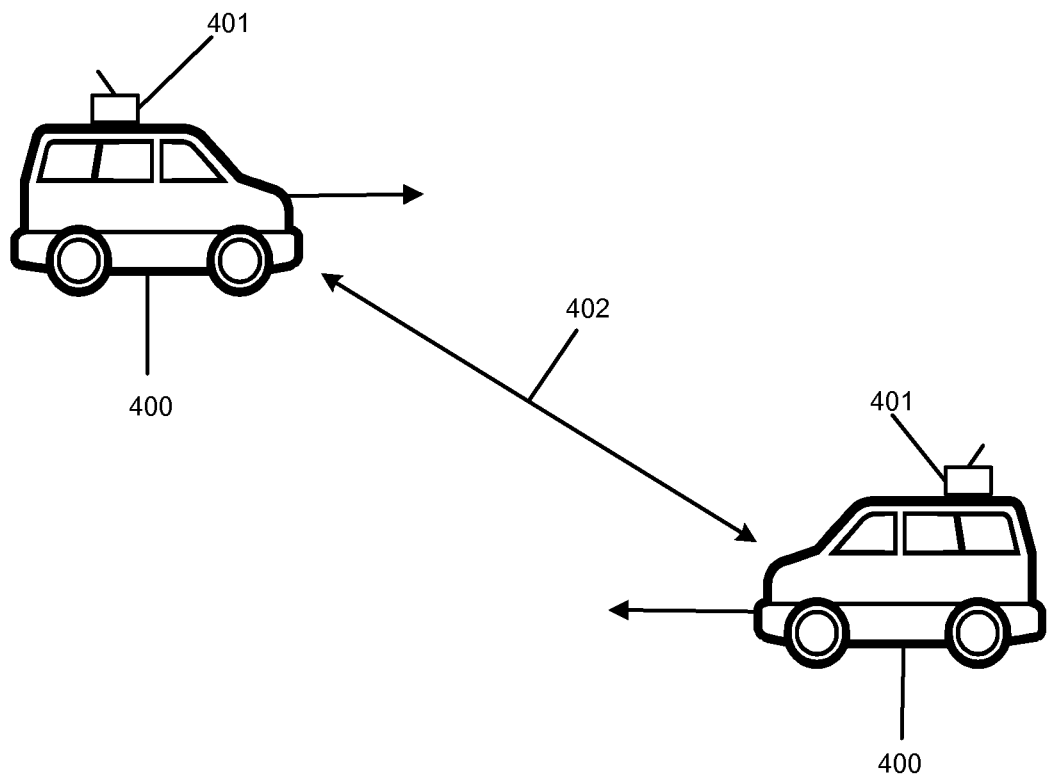
FIG. 4 is a schematic diagram of a vehicular communications network.

In another embodiment now described with reference to FIG. 4 the source node and the destination node are mobile communications devices having wireless network interface controllers for connecting to one another. The nodes have limited computational power. The source and destination nodes may directly interface to one another in an ad hoc mode using communications protocols based on those defined in the IEEE 802.11 family of standards (as represented by arrow 402 in FIG. 4). In this embodiment the communications link between the source and destination node is short lived (on the order of a few seconds, such as 40 seconds or less) and lossy. For example, the source and destination nodes are integral with satellite navigation devices 401 in moving vehicles 400.

In order to identify one or more files that need transferring between the two nodes a content discovery process of any suitable type is used. For example, this may be a content discovery process as described below with reference to FIGS. 5 to 11.

For the content transfer process the methods described above with reference to FIGS. 2 and 3 may be used. In another example, TCP over IP is used for this process.

The methods described above do not require the use of a coding scheme whereby the data is encoded such that if an arbitrary set of the packets are received, the receiver is able to reconstruct the original data. Use of coding schemes was investigated and found to require computational resources much greater than those available on typical vehicle satellite navigation devices and the like.

Example content discovery processes are now described.

A method at a source node in a communications network such as the communications network 100 of FIG. 1 is now described with reference to the block diagram of FIG. 5. This method comprises broadcasting adverts from the source node. Those adverts are received at a destination node in the communications network and may be used to identify a file that needs transferring with few round trips (as described below with reference to FIG. 6). In addition, the two nodes are able to efficiently determine which files they have in common and which node has the latest version (as described below with reference to FIG. 6). This type of process may be referred to as a content discovery process for dynamic content.

A source node accesses (block 500 FIG. 5) its dynamic cache at which files are stored for content distribution. Each file has a name, version and public key. For each file the source node generates two identifiers (block 201). A file identifier is generated for a file based on the file's name and public key. An instance identifier is generated for a file based on the file's name, public key and version.

Figure 5:
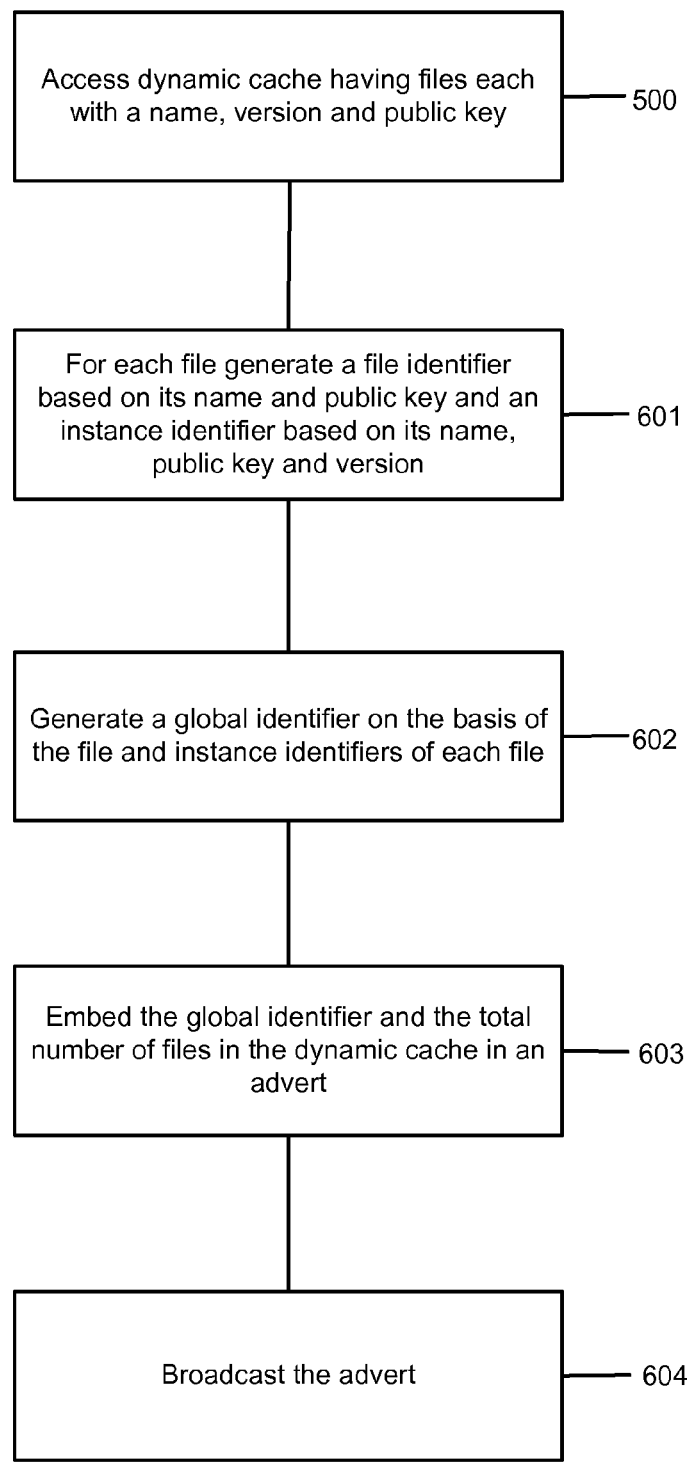
FIG. 5 is a block diagram of a method at a node in a communications network.

The source node also generates a global identifier as a function of the file and instance identifiers of each file (see block 502 of FIG. 5). That is, there is a single global identifier per dynamic cache. The source node embeds the global identifier as well as information about the total number of files in its dynamic cache into an advert message (block 503 of FIG. 5). The source node repeatedly broadcasts the advert (block 504) as described above.

A destination node receives (block 600 of FIG. 6) an advert such as that broadcast at block 304 of FIG. 3. The destination node optionally checks (block 601) whether it has less files than the advert sender in its dynamic cache. It uses the information in the received advert about the number of files at the source node dynamic cache to do this.

This optional check is made in order to reduce the number of messages required to complete the negotiation as to which files are held in common between the two nodes and which node has the latest version of each of those files. The node with the smallest number of files in its dynamic cache begins the process in order to reduce this number of messages. The process is workable without the check at block 601 being made and in that case, it is not necessary for the adverts to incorporate information about the number of files held in the dynamic cache of the appropriate node.

Figure 6:
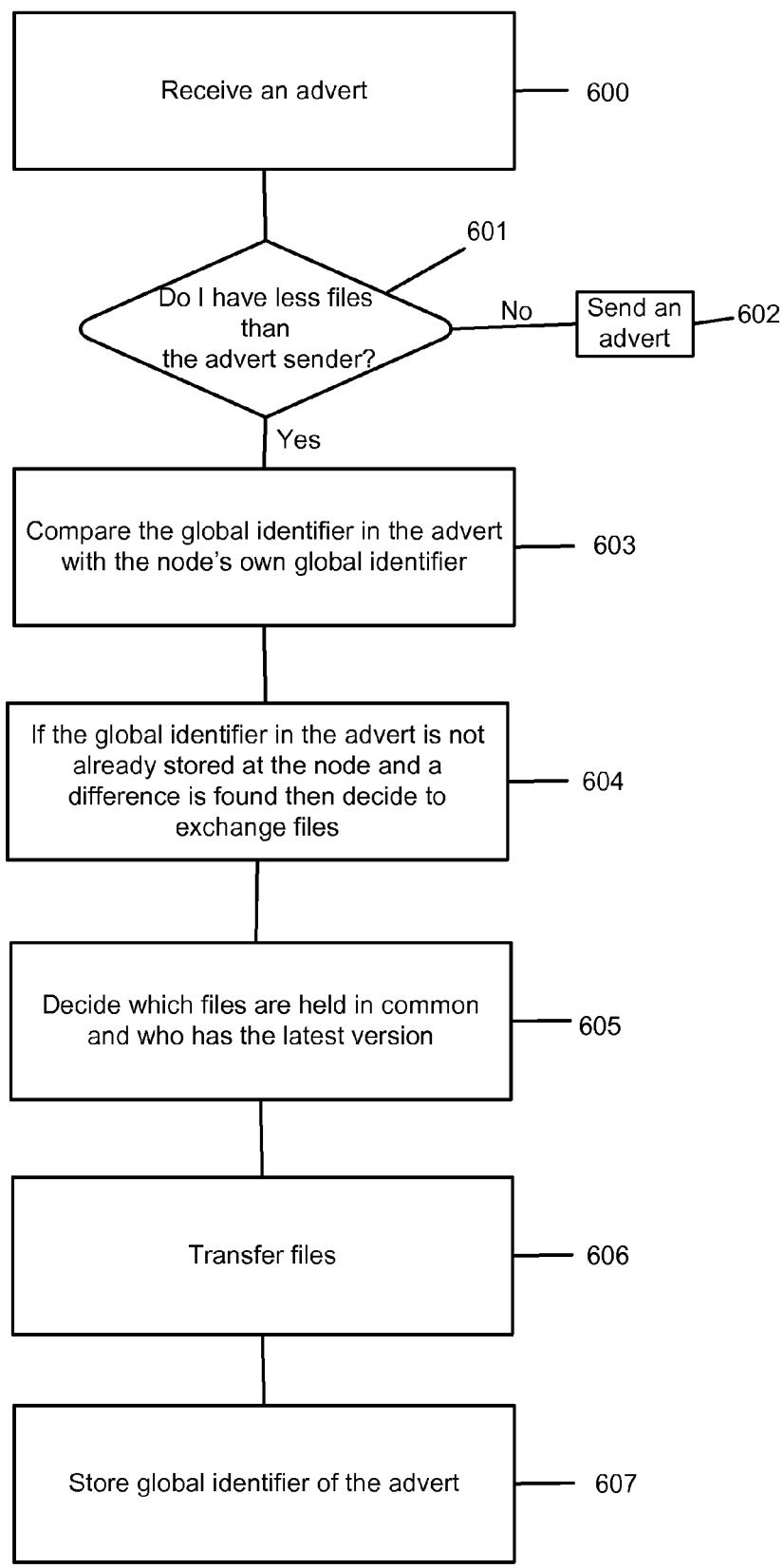
FIG. 6 is a block diagram of a method of content discovery at a node in a communications network.

If the destination node has fewer files in its dynamic cache than the source node, the destination node proceeds with the process as shown in FIG. 6. Otherwise the destination node continues to broadcast adverts (block 602).

In order to decide whether to exchange files with the source node, the destination node compares its global identifier with that in the received advert (block 603). If a difference is found then the source and destination nodes have different content files. Destination nodes are optionally arranged to store address of the source node and the global identifier of any source node with which they have completely exchanged their dynamic cache content (block 604). This prevents the content discovery process from being undergone unnecessarily for nodes that have already been synchronized.

A process for deciding which dynamic cache files are held in common and which node has the latest version of these is next undergone (block 605). This process is described in more detail with reference to FIGS. 7 and 8. The identified files are transferred (block 606) using any suitable content transfer process, for example, TCP over IP or any other suitable packet-based content transfer process. After synchronization, the address of the source node and the global identifier in the received advert are optionally stored at the destination node (block 607).

Because the set of files in a dynamic cache of a node may be arbitrarily large and because the amount of data that can be transferred in a payload of a packet is limited, it is difficult to achieve the content discovery process in an efficient manner. In order to address this data structures are employed to transfer data about the files in the dynamic caches between the nodes and those data structures are designed in a particular manner to enable the content discovery process to be achieved simply and efficiently.

In a particular example, the data structures are based on Bloom filters. However, it is not essential to use Bloom filters. Any suitable data structure may be used which is able to encode file set membership in a manner such that the data structure may be used to determine if a particular file was a member of the set of encoded files without providing false negatives. Bloom filters are described in detail in B. Bloom, "Space/time trade-offs in hash coding with allowable errors." Communications of the ACM, 13(7):422-426, 1970.

A Bloom filter comprises a bit array of certain length, where, for each items of a given set, the $hash_j(item)^{th}$ bit is set, for all hash functions in a given set of j hash functions. In order to check whether an item is present in the set, each $hash_j(item)^{th}$ is checked, and if each bit is set then the bloom filter is considered to contain the item. Bloom filters cannot yield false negatives, but they can yield false positives. In general there is a trade off between the number of items that can be encoded in a Bloom filter of a given length and the probability of false positives.

In some embodiments full Bloom filters are used where the file identifiers of all files in a dynamic cache are encoded in the Bloom filter. However, in other embodiments partial Bloom filters are used in which only a subset of the file identifiers are encoded. For example, the first 1000 or the first 500 file identifiers.

In a particular embodiment a bloom filter with array length 18288 bits is provided which is arranged to be the same as the size of a packet payload. Using the heuristics presented by Mitzenmacher (M. Mitzenmacher. Compressed bloom filters. IEEE/ACM Transactions on Networking, 10(5), 2002) 1000 file identifiers are encoded per partial Bloom filter using 12 hash functions. This yields a false positive probability of 0.0154%. However, it is not essential to use these particular Bloom filter parameters.

A negotiation scheme to determine the appropriate files for transfer between two nodes A and B is now described with reference to FIGS. 7, 8 and 9. The processes of FIGS. 7 and 8 describe in more detail the process described at high level in block 605 of FIG. 3. Suppose that node B is the node with the fewer files in its dynamic cache (although this is not essential as mentioned above).

Node B receives an advert from node A. This advert comprises a global identifier as mentioned above and optionally details about the number of files in A's dynamic cache. Using this information B is able to establish that it has fewer files in its dynamic cache and that at least oen file needs transferring between A and B.

Node B generates and sends to node A a first data structure. This first data structure is formed from the file identifiers of a specified set of files at the dynamic cache (block 700 of FIG. 7). The file identifiers are described above with reference to FIG. 5.

Node B also generates and sends to node A a second data structure. This second data structure is formed from the instance identifiers of the same files (block 701 of FIG. 7). The specified set of files may be a subset of the files at the dynamic cache or may be all those files. The instance identifiers are described above with reference to FIG. 5.

Figure 9:
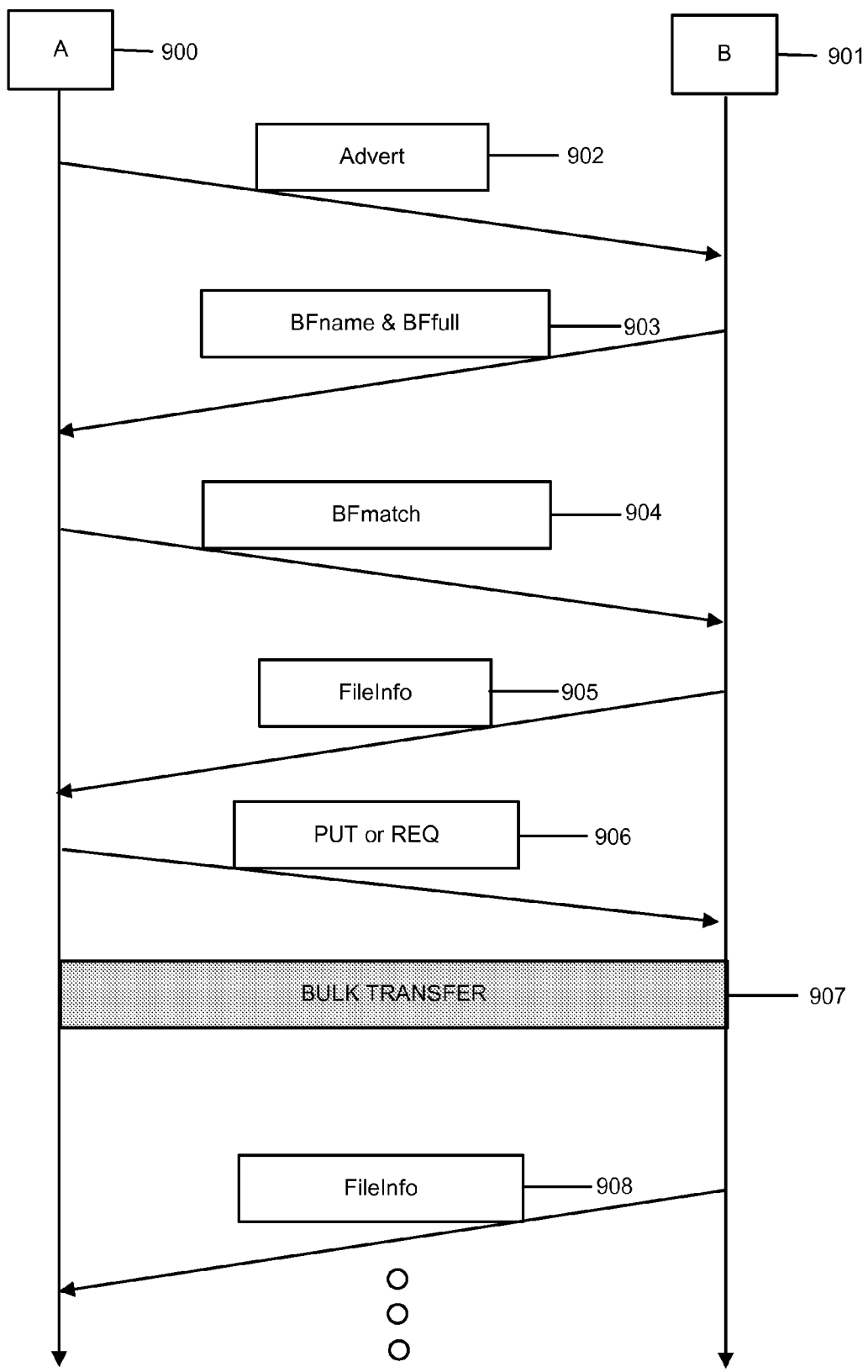
FIG. 9 is a message sequence diagram of a process of content discovery for files in a dynamic cache.

Node B creates and sends the first and second data structures to node A in message 903 (see FIG. 9). In an example, this message is a full frame (or packet) comprising two partial Bloom filters both using half of the available bits. The first partial Bloom filter is generated from the file identifiers of B's first 500 local files. The second partial Bloom filter is generated from the instance identifiers of B's first 500 local files.

Figure 8:
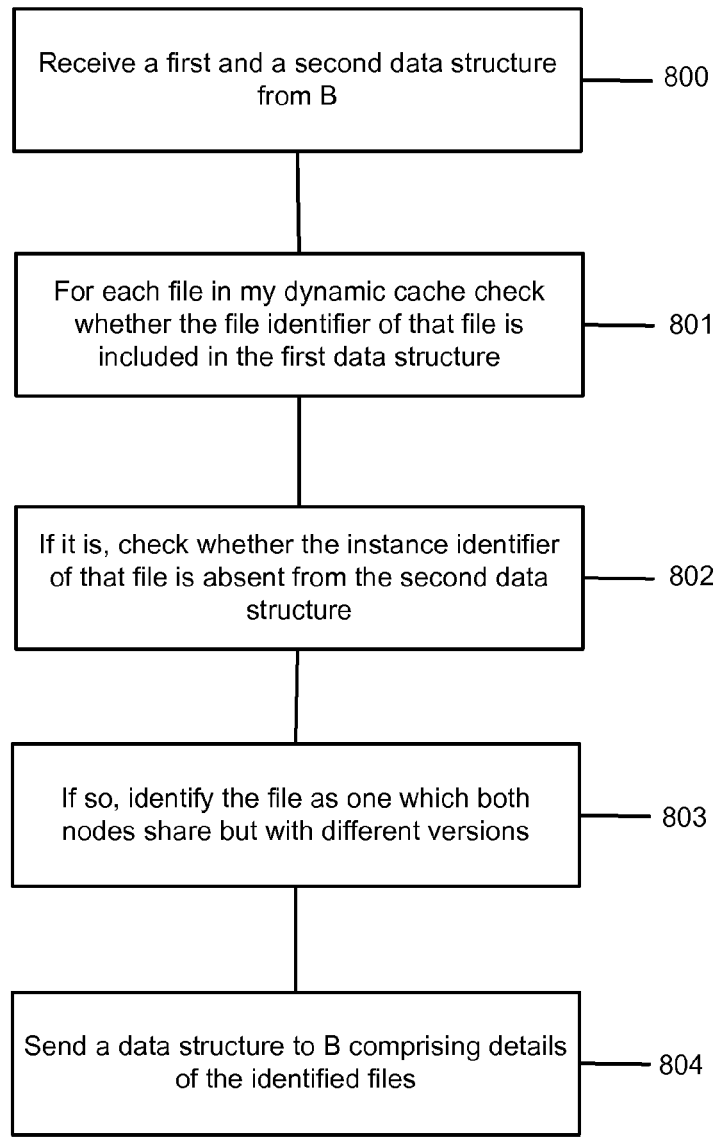
FIG. 8 is a block diagram of another example method of content discovery at a node in a communications network.

Device A receives the first data structure and the second data structure from B and proceeds to make the checks as described at blocks 801 and 802 of FIG. 8. With reference to FIG. 8, node A receives the first and second data structures from node B (block 800). For each file in its dynamic cache, node A checks whether the file identifier of that file is included in the first data structure (block 801). If so, a check is made as to whether the instance identifier of that file is absent from the second data structure (block 802). If so, the file is selected as one which both nodes share (except in the case of a false positive) but with different versions (block 803). In that case, a data structure is sent to B comprising details of the selected files (block 804). A then responds to B by sending a full frame sized, partial bloom filter (message 904) formed from the file identifiers of all files in A that are represented in the first data structure received from B but which is it believed are not represented in the second data structure received from B. The full frame sized partial Bloom filter is sent by A to B.

B receives the full frame sized partial Bloom filter from A and compares the cache of files present on B to determine which of those files are represented in the full frame size partial Bloom filter. For each such file, B sends (905) a file information record containing B's file version and other file information upon which A decides whether to push or pull that file to or from B (message 906). A bulk content transfer process ensues 907 and the process repeats for the next identified file 908.

Referring to FIG. 7 again, node B receives a data structure from node A comprising details of all the identified files of the set which both nodes share but with different versions (block 702). Node B, for each identified file, sends a file information record to node A (block 703) and receives a request from A to push or pull that file (block 704). A content transfer process is then entered to transfer the file (block 705) and this process is repeated for each identified file as illustrated in FIG. 7. Any suitable content transfer process may be used.

Figure 7:
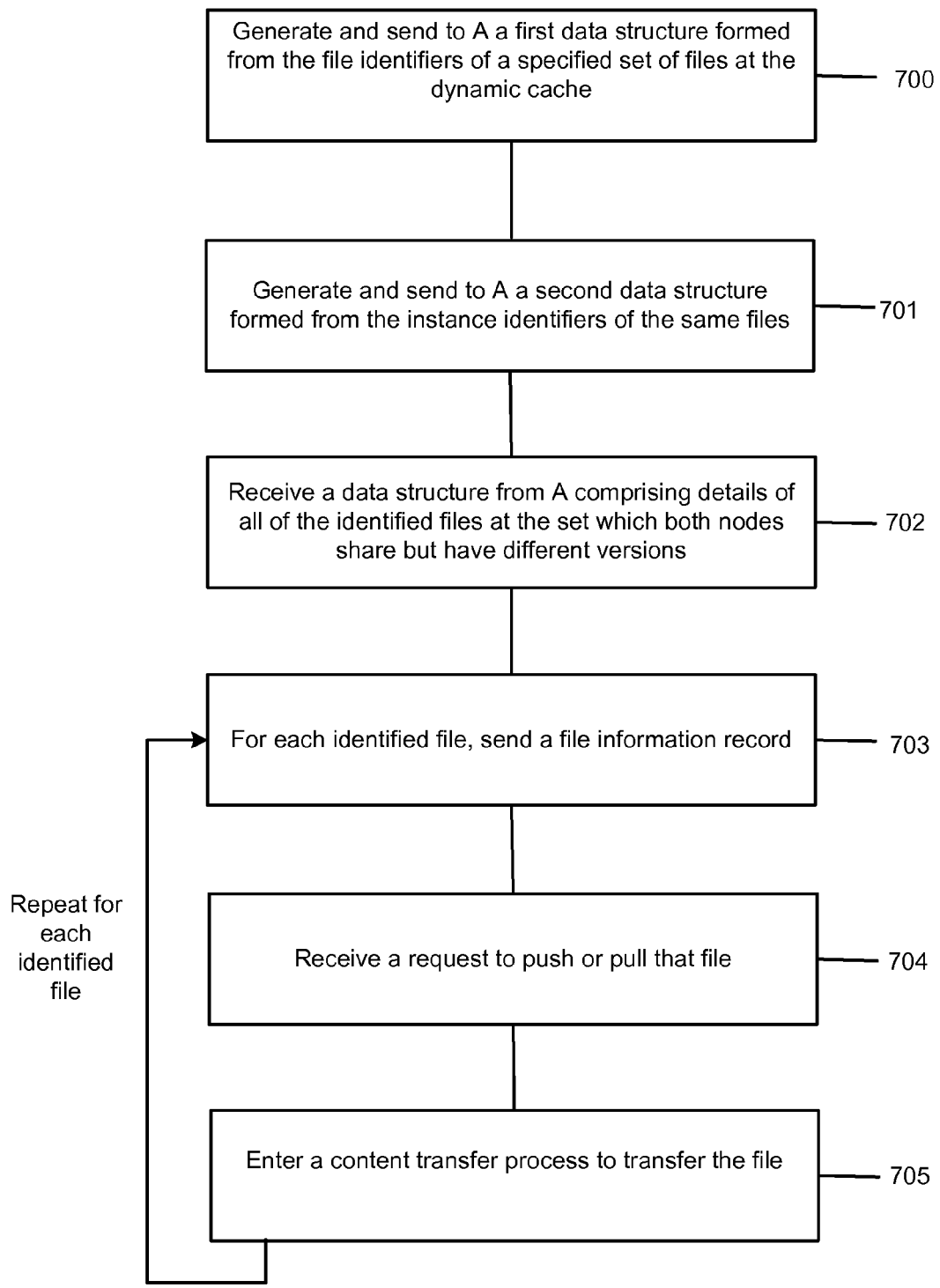
FIG. 7 is a block diagram of another example method of content discovery at a node in a communications network.

The methods of FIGS. 7 and 8 are summarized in FIG. 9 which represents nodes A 900, and B 901 and messages sent between those nodes. The direction of the arrows indicates the direction in which the messages are sent and the relative position of the arrows on the page indicates the sequence of the messages in time.

Various modifications may be made to the methods. For example, the partial Bloom filters may be formed from any suitable pre-specified number of local files selected at random or in any other suitable way. In another example, instead of using two partial Bloom filters, a single Bloom filter is used to encode the data for both the first and second data structures. That is, the first and second data structures may be integral.

In a particular example, each file i in a dynamic cache $d_d$ has a file name $fname_i$ and a 16-bit version $version_i$ as well as the public key $pk_i$ of its owner associated with it. Using the SHA-1 hash function H, a node generates for each file i in $d_d$ two unique 160-bit identifiers:

$$\text{File Identifier}_i = H(\text{concat}(fname_i, pk_i)) \text{ and}$$

$$\text{Instance Identifier}_i = H(\text{concat}(fname_i, pk_i, version_i)).$$

A single 160-bit hash key that represents the entire content of $d_d$ is generated: Global Identifier=H (concat($Instance_1$, $instance_2$, . . . , $Instance_n$)) for all n files in $d_d$ ordered on Instance Identifier. In another embodiment the global identifier may be generated using hash chaining. The Global identifier is generated using a consistent ordering so two nodes with the same files and versions have the same global identifier. Any suitable ordering may be used provided it is used consistently. Each device embeds its Global Identifier in its periodic beacons. Any device can thus compare its 160-bit Global Identifier with that of another device (whose advert it has just heard), and quickly determine if the devices have the same or different content files. As a Global Identifier only takes up 20 bytes, periodic adverts remain small.

Each node in the communications network may also hold fixed content files in a fixed content cache. Fixed content is expected to be present on all nodes and examples of fixed content may be operating system files.

Figure 10:
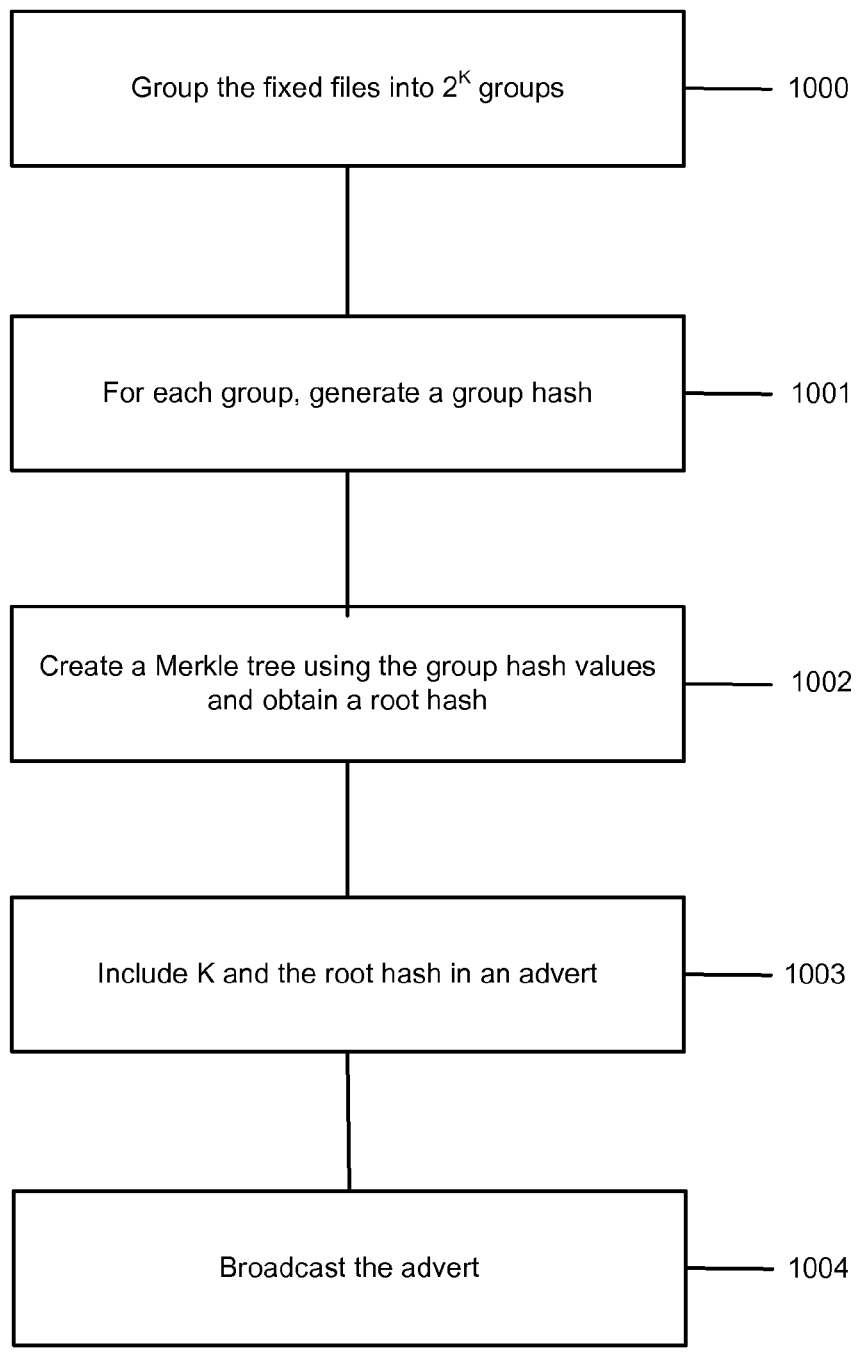
FIG. 10 is a block diagram of another method of content discovery.
Figure 11:
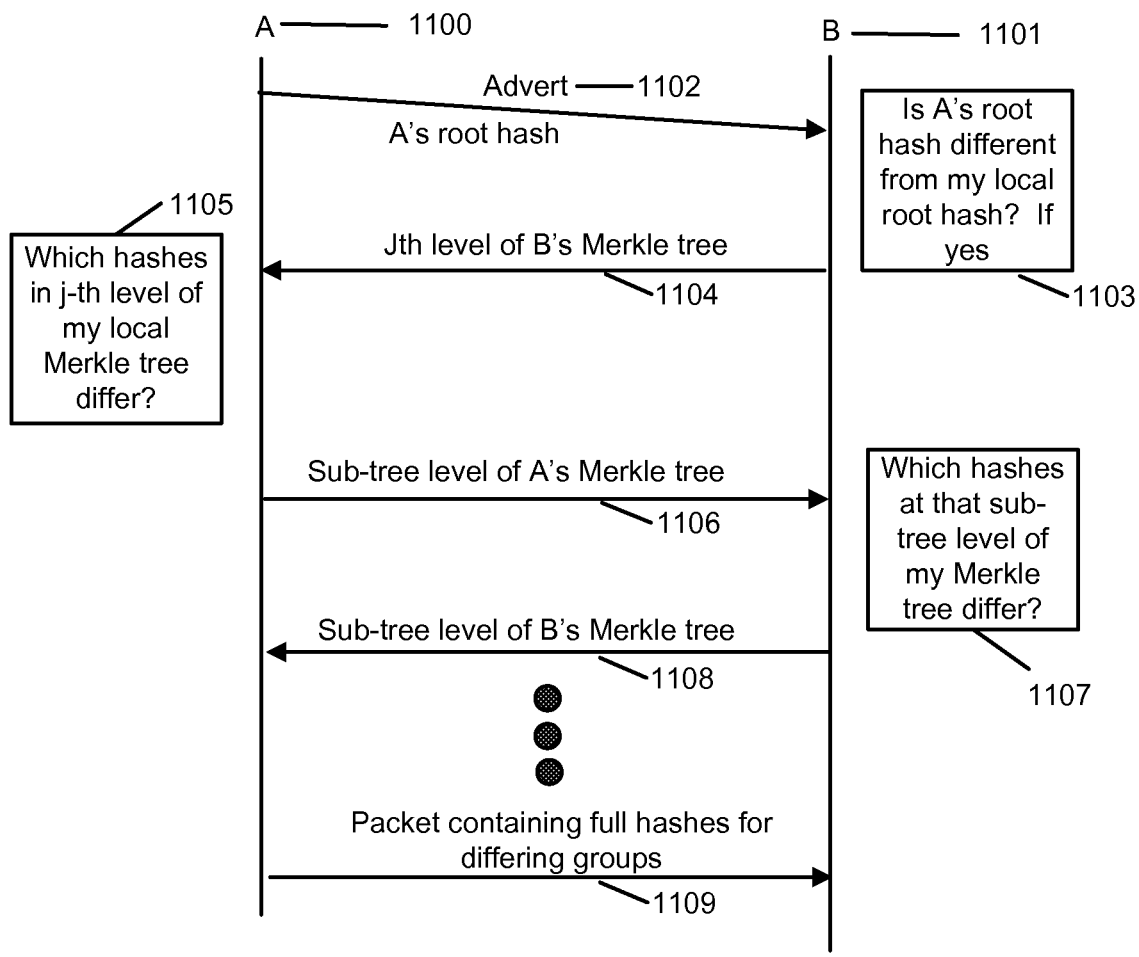
FIG. 11 is a message sequence diagram of a process of content discovery for example, for fixed file content.

An example of a process for fixed content discovery is now described with reference to FIG. 10. Each node generates information for embedding in an advert and broadcasts this advert as now described. The node groups its fixed files into $2^k$ groups (block 1000). For example, for each fixed file, the k-bit prefix of the file identifier (as described above with reference to FIG. 5) is taken. This file identifier may be the hash of the content providers public key and the textual name of the file. All the files having the same prefix are put into a group. The value of k may be selected such that each group has on average m files, for example m=16, k=4. This yields $2^k$ groups, represented as $g_0$ to $g_{2k}$. The file identifier is used so that the files are grouped independently of their version.

For each group a group hash is generated automatically by a processor on the node (block 1001). For each file a instance identifier is created by taking a hash of the file certificate. The files in each group are then ranked using their instance identifier value and a group hash is generated by hash chaining. That is, each instance identifier is recursively hashed e.g. H(IdFile4, H(IdFile3, H(IdFile2, H(IdFile1)))). Where H represents a hash function.

A Merkle tree is then created automatically using a processor at the node (block 1002). Merkle-trees are described in detail in R. Merkle. A digital signature based on a conventional encryption function. In Crypto' 87, 1987. Each row of the Merkle tree is generated by taking pairs from the previous row and hashing them together. The group hash values are the leaves of the tree and are ranked according to their k-bit prefix. For empty groups, a null token is used. The root of the Merkle tree is a unique hash for the entire fixed file set, parameterized by the value of k used. Any node can determine if their fixed sets are identical by comparing the root hash for the same value of k. If the root hashes differ then the nodes have different content. The root hash and the value of k is included in a beacon (block 1003) and broadcast (block 1004).

If a node detects that its root hash differs from another nodes' root hash it carries out a recursive process to determine which files are different in the fixed caches at the two nodes. This is now described with reference to FIG. 11.

Node A 1100 broadcasts an advert 1102 which is received by node B 1101. A processor at node B 1101 automatically checks whether the root hash in the advert is different from node B's local root hash (block 1103). If so, the processor at node B selects a $j^{th}$ level of node B's Merkle tree and sends that to node A in a packet 1104. The $j^{th}$ level is selected based on the payload size of the packets being used by the communications protocol. For example, the $j^{th}$ level of the Merkle tree is selected such that $2^{j}*20<$payload size. At node A a processor automatically checks 1105 which hashes in the $j^{th}$ level of its local Merkle tree differ from those received in the packet 1104. For those differing hashes node A sends an associated sub-tree level of its local Merkle tree to node B using packet 1106. Node B then checks which hashes at that sub-tree level of its local Merkle tree differ from those received in packet 1106. It selects an associated sub-tree level of its local Markle tree based on those differing hashes and sends that sub-tree level back to Node A using packet 1108. This process repeats until the full hashes for the set of groups that may differ can be fitted into a packet. In some embodiments, two groups fit into a single packet thereby keeping the number of packets required low, and this influences the choice of the value of m.

This provides a very efficient algorithm that efficiently allows a node to detect a differing file with low overhead. For example, in an implementation which uses a payload size of 2304 bytes, it is possible to fit 115 hashes in a single packet. In this case, the likelihood that groups have more than 57 files is low when m=16. (When m=16 the probability of a single group having 56 entries or more is $10_{-15}$. Only one level of the Merkle tree needs to be exchanges in this case in order to discover a file that is different, where that the number of files in the fixed set is less than approximately 3650. Thus the process is able to efficiently identify a differing file rapidly, in a few messages.

It is possible to add and remove files from the fixed file cache. The addition of a file impacts a single group and the file is mapped into a single group. A permanent record may be kept of deleted files. The grouping of the files makes it possible to efficiently determine which groups are required in the event that one or more files are added or removed. For example, the grouping is such that a single group is impacted when a file is added. Then, if two files are added, each in a different group, it is possible to efficiently determine which two groups have been impacted. It is not necessary to repeat the content discovery process after the first differing file has been found.

In an evaluation a number of experiments were run on a small vehicular testbed, consisting of two cars. For all the experiments a laptop running Microsoft® Windows® XP SP2 with a Netgear (trademark) WAG511 PCMCIA card, which uses the Atheros (trademark) ar5212 chipset, was installed in each vehicle. Two possible configurations for the 802.11 antenna were calculated: in the baseline case the laptop was placed on the rear parcel shelf, consistent with the height that a portable SatNav device would be mounted. In the second case, the antenna was placed external to the car by mounting a laptop on the roof of each car. In order to minimize interference from other wireless networks deployed in homes 802.11a, was used which operates on the 5.4 GHz band. Additionally, both laptops were equipped with a GPS receiver to record their respective location and velocity. In the experiments each laptop was configured to use the Atheros (trademark) Reference Driver, modified to ensure rapid link-level discovery. For each experiment, both laptops had the same 50 file entries in their $d_d$. One of the laptops had a later version of each file, with each file 10 MB in size. When the two devices become connected, they determine the set of files to transfer, using the content discovery algorithms described earlier. In order to transfer the file, two configurations are considered: TCP and Broadside. TCP: In this configuration, the standard unmodified Windows® XP SP2 TCP/IP stack is used, and files are transferred using TCP configured with the standard MTU of 1500 bytes. In order to remove the overheads of assigning IP addresses to the laptops dynamically, we statically configured each with a non-conflicting IP address. Broadside: In this configuration, the TCP/IP stack is disabled and the data transfer protocol described with reference to FIGS. 9 and 10 is used. This means no IP address need be assigned to each laptop, and the data transfer is configured to use the maximum frame size of 2304 bytes. The experiments were run on streets in Cambridge, UK. In order to increase confidence in the results, all experiments ran on the same day, running each experiment 5 times, back-to-back, attempting to ensure that all experiments were run at the same vehicle velocities. In the interest of repeatability only one moving car was used in our experiments and the second car parked by the road side. The moving car acted as the data source throughout, transmitting to the stationary car. For each experiment 5 runs are obtained. The duration of each run differs, so for each the achieved goodput is normalized by the duration of the connectivity between the laptops, to provide to goodput in bytes per second. The 5 runs are ranked based on this goodput metric, and the run which achieved the median value selected to then cross-compare. The location is close to central Cambridge but, due to a local traffic calming scheme, has only a modest amount of through traffic. The area is densely populated with buildings typical of $19^{th}$ century town-center development in Europe, with characteristically narrow roads lined with two-storey terraced houses. With a continuous row of packed cars along one or both kerbs, there is insufficient room for two cards to pass in opposite directions, and a one-way traffic system is enforced together with speed-bumps. This limited the speed of our car to between 10 and 15 miles per hour at the point of closest approach. The results show that TCP achieves reasonable goodput, of nearly 1 MB/sec, both with an internal and external antenna. Broadside outperforms TCP by a factor of 1.61 using an internal antenna, and by a factor or 1.85 with an external antenna. The connection time and total bytes of goodput are shown in the table below.

|  | Time | Goodput |
|---|---|---|
| TCP internal | 15.594 | 15,294,708 |
| Broadside internal | 13.797 | 21,915,440 |
| TCP external | 28.172 | 25,731,072 |
| Broadside external | 26.765 | 45,301,480 |

Figure 12:
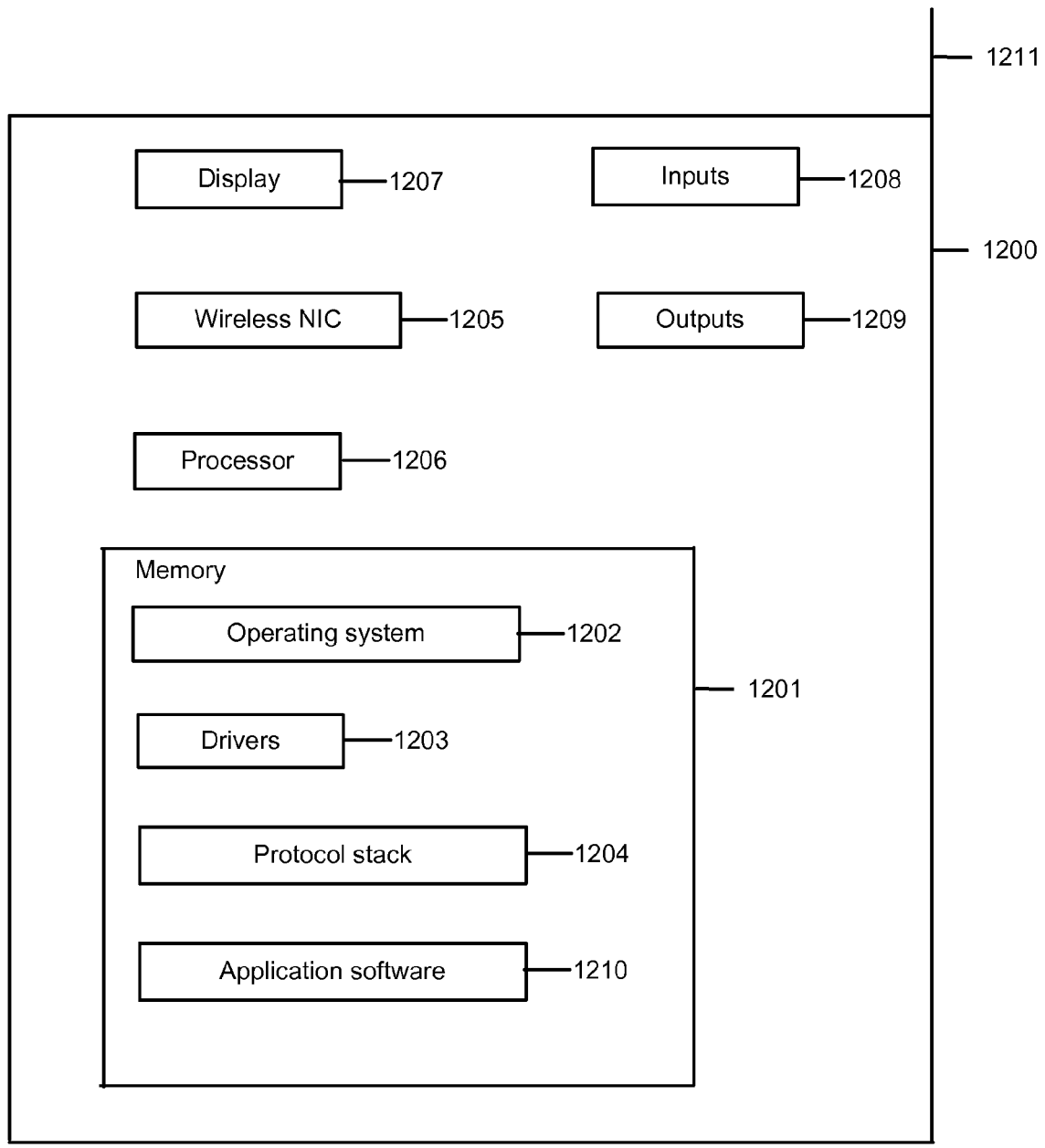
FIG. 12 illustrates an exemplary computing-based device in which embodiments of a communications node may be implemented.

FIG. 12 illustrates various components of an exemplary computing-based device 1200 which may be implemented as any form of a computing and/or electronic device, and in which embodiments of any of the communications nodes described herein may be implemented. For example, the device 1200 may be a PDA, Laptop computer, Satellite navigation device for use in a vehicle or other suitable computing-based device.

The computing-based device 1200 comprises one or more inputs 1208 which are of any suitable type for receiving media content, Internet Protocol (IP) input, or other input. The device also comprises a wireless antenna 1211 and a wireless network interface controller 1205.

Computing-based device 1200 also comprises one or more processors 1206 which may be microprocessors, controllers or any other suitable type of processors for processing computing executable instructions to control the operation of the device in order to communicate with another node, discover content at that node and transfer content with that node. Platform software comprising an operating system 1202 or any other suitable platform software may be provided at the computing-based device to enable application software 1210 to be executed on the device.

The computer executable instructions may be provided using any computer-readable media, such as memory 1201. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 1209 is also provided such as an audio and/or video output to a display 1207 integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A mobile communications network node comprising:
a memory storing a plurality of files that synchronizes with at least one other node in a communications network;
a wireless interface arranged to establish a wireless communications link with the at least one other node; and
a processor arranged to:
establish the wireless communication link for a time and control the wireless interface such that the wireless communications link has a rate of synchronization being at least one megabyte per second during the time;
access information indicating a number of blocks to be received at the mobile communications node from the at least one other node;
create a receive vector having one bit for each of the number of blocks, the processor also being arranged to monitor a number of set bits in the receive vector;
for each bit in the receive vector, set the respective bit when an associated block is received from at least one other node;
determine when the total number of set bits meets a threshold that triggers sending the receive vector;
monitor to determine a predefined number of duplicate packets have been received;
trigger to send the receive vector when the predefined number of duplicate packets have been received; and
send the receive vector to the at least one other node when the total number of set bits meets the threshold.

2. A mobile communications node as claimed in claim 1 which is integral with a vehicle satellite navigation device.

3. A mobile communications node as claimed in claim 1 wherein the memory is arranged to store the plurality of files in a plurality of groups and wherein the processor is arranged to generate, for each group, a group hash and to create and store in the memory a tree-based data structure using group hash values.

4. A mobile communications node as claimed in claim 3 wherein the processor is arranged to create and broadcast a beacon being a packet comprising information about a number of groups and information about the tree-based data structure.

5. A mobile communications node as claimed in claim 1 wherein the processor is arranged to create and send first and second data structures in a single packet to the at least one other node, those first and second data structures being partial Bloom filters.

6. A mobile communications node as claimed in claim 5 wherein the first data structure is formed using file names and public keys of the plurality of files and the second data structure is formed using file names, public keys and version numbers of the plurality of files.

7. A method for controlling a wireless interface of a mobile communications network node comprising:
establishing a wireless communications link with a source node;
accessing information indicating a number of blocks to be received at the mobile communications network node from the source node;
creating a receive vector having one bit for each of the number of blocks;
setting for each bit in the receive vector, the respective bit when an associated block is received from the source node;
monitoring, by a processor, a number of set bits in the receive vector;
wherein when the monitoring reveals that a predefined number of duplicate packets have been received, triggering the sending of the receive vector;
determining when the total number of set bits meets a threshold that triggers sending the receive vector; and
sending the receive vector to the source node when the total number of set bits meets the threshold.

8. A mobile communications network node comprising:
a memory storing a plurality of files that synchronizes with at least one other node in a communications network;
a wireless interface arranged to establish a wireless communications link with the at least one other node; and
a processor arranged to:
access information about a number of blocks to be received at the mobile communications network node from at least one other node;
create a receive vector having one bit for each of the number of blocks;
create and send first and second data structures in a single packet to at least one other node, those first and second data structures being partial Bloom filters, wherein the first data structure is formed using file names and public keys of the plurality of files and the second data structure is formed using file names, public keys and version numbers of the plurality of files;
set for each bit in the receive vector, the respective bit when an associated block is received from the at least one other node;
monitor a number of set bits in the receive vector; and
send the receive vector to the other node based at least on the monitored number of set bits in the receive vector.

9. A mobile communications node as claimed in claim 1, further comprising:
determining when the number of set bits in the receive vector satisfies a threshold;
and sending the receive vector when the number of set bits satisfies the threshold, wherein the threshold is a pre-defined increase percentage in the number of set bits based on a total number of bits in the received vector.

10. A method as claimed in claim 7, wherein the threshold is a pre-defined increase percentage in the number of set bits based on a total number of bits in the received vector.

11. A method as claimed in claim 7, further comprising:
storing a plurality of files at the mobile communications network node in a plurality of groups; and
generating, for each group, a group hash to create a tree-based data structure using group hash values.

12. A method as claimed in claim 11, further comprising creating and broadcasting a beacon comprising information about a number of groups and information about the tree-based data structure.

13. A method as claimed in claim 7, further comprising:
creating and sending first and second data structures in a single packet to the source node, the first and second data structures being partial Bloom filters.

14. A method as claimed in claim 13, wherein the first data structure is formed using file names and public keys of a plurality of files and the second data structure is formed using file names, public keys and version numbers of the plurality of files.

15. A mobile communications node as claimed in claim 8, wherein the monitoring reveals when the number of set bits increases by a threshold proportion compared to a total number of bits in the received vector, and the processor is further arranged to trigger the sending of the receive vector when the number of set bits increases by the threshold proportion.

16. A mobile communications node as claimed in claim 8, wherein the monitoring reveals that a predefined number of duplicate packets have been received, and the processor is further arranged to trigger the sending of the receive vector when the predefined number of duplicate packets have been received.

17. A mobile communications node as claimed in claim 8, wherein the memory is arranged to store the plurality of files in a plurality of groups and wherein the processor is arranged to generate, for each group, a group hash and to create and store in the memory a tree-based data structure using group hash values.

18. A mobile communications node as claimed in claim 17, wherein the processor is arranged to create and broadcast a beacon comprising information about a number of groups and information about the tree-based data structure.

* * * * *